United States Patent
Maner et al.

(10) Patent No.: US 7,540,632 B2
(45) Date of Patent: Jun. 2, 2009

(54) SPECTRALLY CONTROLLED DISPLAY BACKLIGHT EMISSIONS FOR NIGHT VISION IMAGING SYSTEM COMPATIBILITY

(75) Inventors: Randy M. Maner, Albuquerque, NM (US); Michael R. Praiswater, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 161 days.

(21) Appl. No.: 11/602,642

(22) Filed: Nov. 21, 2006

(65) Prior Publication Data

US 2008/0117358 A1 May 22, 2008

(51) Int. Cl.
*F21S 9/00* (2006.01)

(52) U.S. Cl. .......................... 362/293; 362/317; 362/2; 362/583; 362/228; 349/68; 349/64; 359/350; 359/351; 359/352; 359/353; 359/354; 359/355; 359/356; 359/357; 359/359

(58) Field of Classification Search ........................ None
See application file for complete search history.

(56) References Cited

U.S. PATENT DOCUMENTS

| | | | |
|---|---|---|---|
| 3,618,193 A * | 11/1971 | Anderson et al. | ........... 428/632 |
| 5,661,578 A | 8/1997 | Habing et al. | |
| 6,100,952 A | 8/2000 | Marvin et al. | |
| 6,111,622 A | 8/2000 | Abileah | |
| 6,834,984 B2 * | 12/2004 | Tausch et al. | ............... 362/346 |
| 6,842,204 B1 | 1/2005 | Johnson | |
| 2002/0015305 A1 * | 2/2002 | Bornhorst et al. | ........... 362/293 |
| 2006/0039161 A1 | 2/2006 | Saccomanno | |

FOREIGN PATENT DOCUMENTS

EP   0615151 A1   9/1994

OTHER PUBLICATIONS

EP Search Report, 07121054.6-2217, dated Jun. 3, 2008.

* cited by examiner

*Primary Examiner*—Sandra L O'Shea
*Assistant Examiner*—Danielle Dunn
(74) *Attorney, Agent, or Firm*—Ingrassia Fisher & Lorenz, P.C.

(57) ABSTRACT

A lighting assembly topology that utilizes spectrum controlling materials to render the illumination compatible with night vision imaging systems. The lighting assembly can be used as either a general illumination source or can be used as a backlight for a transmissive display such as a liquid crystal display. The lighting assembly makes use of spectral filtering which is both transmissive and absorptive for specific spectral regions. The exit port of the lighting assembly is completely filtered with a red and near infrared reflective filter. The absorption of the near infrared spectrum to which NVIS are sensitive is reflected by the typical near infrared reflective filter covering the exit port and absorbed within the material lining the housing of the lighting assembly.

17 Claims, 6 Drawing Sheets

SPECTRALLY CONTROLLED DISPLAY BACKLIGHT EMISSIONS FOR NIGHT VISION IMAGING SYSTEM COMPATIBILITY

BACKGROUND OF THE INVENTION

1. Field of the Invention (Technical Field)

This present invention relates to night vision imaging systems (NVIS), and more particularly to backlights for transmissive displays required to meet NVIS radiance requirements. It also relates to general illumination assemblies, which are used with night vision goggles.

2. Background Art

The present invention resulted from a desire to lower the cost of NVIS compliant backlights while maintaining optical efficiency. Typically optical filters used to achieve NVIS compliance for full color displays are constructed from two distinct optical components, a reflective component and an absorptive component. The absorptive component typically represents more than half of the cost of the NVIS filter and it attenuates the visible spectrum by more than half of the total loss associated with the entire NVIS filter.

Presently NVIS compliance is achieved by the addition of an optical filter between the display's light source and the user. This filter may be over the entire backlight opening or just over the light source used for NVIS mode operation. There are multiple examples of these types of backlight architectures.

Honeywell's U.S. Pat. No. 5,661,578, entitled A Color Liquid Crystal Display Backlight System for Night Vision Imaging System Compatibility, uses a NVIS filter located over the nighttime lamp assembly used to achieve NVIS compliance. U.S. Pat. No. 6,111,622, entitled A day/night backlight for a liquid crystal display describes the use of a sharp cut-off IR filter and an IR absorptive filter to achieve NVIS compliance. This patent also describes placing the entire filter adjacent to the LCD stack. U.S. Pat. No. 6,100,952, entitled A NVG-compatible AMLCD backlight having a ridged prismatic TIR with an embedded diffuser, describes the use of an infrared reflecting filter and a diffuser with an infrared absorbing die to achieve NVIS compliance. Both of these elements are placed adjacent to the AMLCD between the light source and the display user. U.S. Pat. No. 6,842,204 uses a NVIS filter over the NVIS mode light sources, which is also situated between the light source and the display user.

These existing prior art approaches for providing NVIS compliance for a full color display make use of a NVIS filter that contains infrared absorbing materials, either glass or plastic filters. The infrared absorptive materials are typically expensive optical elements, which are in the direct optical path of the output illumination thereby decreasing the backlight system's efficiency by attenuating visible illumination.

SUMMARY OF THE INVENTION (DISCLOSURE OF THE INVENTION)

The present invention provides an absorptive material that is low cost and makes use of other existing low cost materials. The infrared absorption is accomplished by placing infrared absorbing materials on the inside surface of the backlight cavity. An example of this low cost material is black paint, but other similar materials could be used such as black anodized or infrared absorbing plastics. A partially transmissive diffuse reflective lining is also used to line the backlight cavity surfaces. This diffuse reflective material is placed between the light source and the infrared absorptive material. This diffuse white reflective material helps provide a uniform light source while still permitting illumination to transmit through it to the IR absorptive material in the backlight cavity. This embodiment also removes the absorptive portion of the NVIS filter from the exit path of the backlight's visible spectrum illumination, which increases the efficiency of the backlight. A reflective near infrared mirror is still used over the NVIS light source, but these filters are typically much more efficient than absorptive NVIS filter materials. A cold mirror is used between the diffusely reflective material lining the cavity and the near infrared absorptive material so that visible illumination is not absorbed and is maintained for transmission through the display. No existing NVIS filter system topology makes use of a cold mirror or low cost near infrared absorptive materials like black paint.

A primary object of the present invention is to provide an illumination system which does not interfere with the use of night vision goggles. This system can be used for backlighting transmissive displays or as a general ambient illumination system.

A primary advantage of the present invention is that it uses lower cost materials to provide NVIS compliance for displays or general ambient illumination systems.

Another advantage is that it provides a more efficient forward path for the visible illumination which lowers the amount of electrical power needed for an output luminance level and also improves NVIS radiance performance.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

Figure 1:
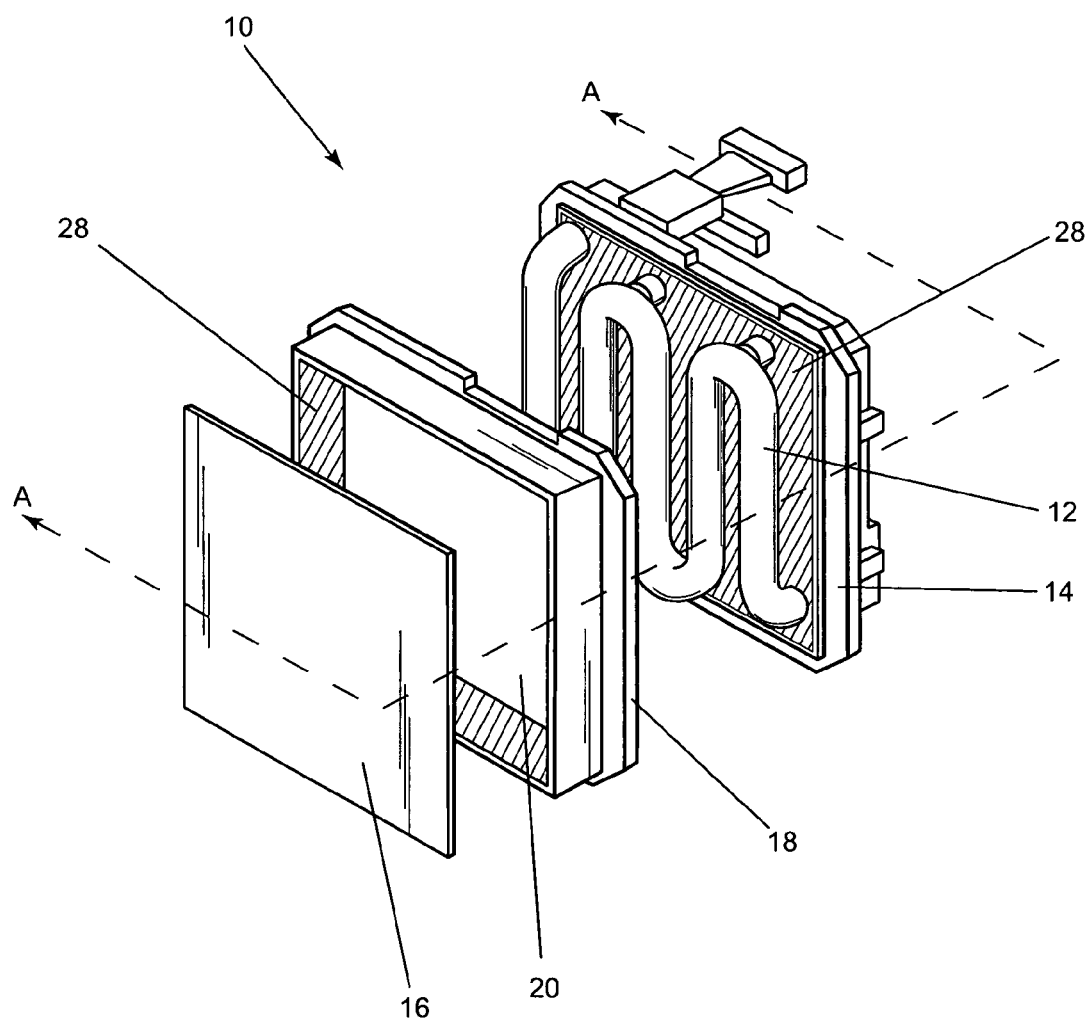
FIG. 1 is an isometric exploded view of the preferred backlight assembly.

FIG. 1 is an isometric view of the preferred backlight assembly 10 used for a liquid crystal display (LCD) with the different parts of the backlight exploded. Backlight 10 is constructed with a serpentine fluorescent lamp 12 as the source of illumination. Lamp 12 is secured onto a mounting plate 14, which also forms the rear side of backlight assembly 10. A near infrared reflecting optical filter 16 is attached to the front perimeter of sidewalls 18 in a manner which prohibits lamp 12 illumination from exiting at this mechanical interface. Optical filter 16 and sidewalls 18 form an enclosure around the front and edge of lamp 12 when fastened to mounting plate 14. Mounting plate 14 and sidewalls 18 are preferably constructed with a material which is opaque to the visible and near infrared wavelengths of 380 to 930 nanometers in the electromagnetic spectrum. The backlight assembly's 10 output illumination exiting the assembly must pass through near infrared reflecting filter 16. The components surrounding lamp 12 form a lamp cavity 20 which conserves energy within the visible spectrum and transmits this out of backlight assembly 10 and simultaneously is efficient at absorbing near infrared energy which is converted to higher wavelengths of heat within the assembly.

Figure 2:
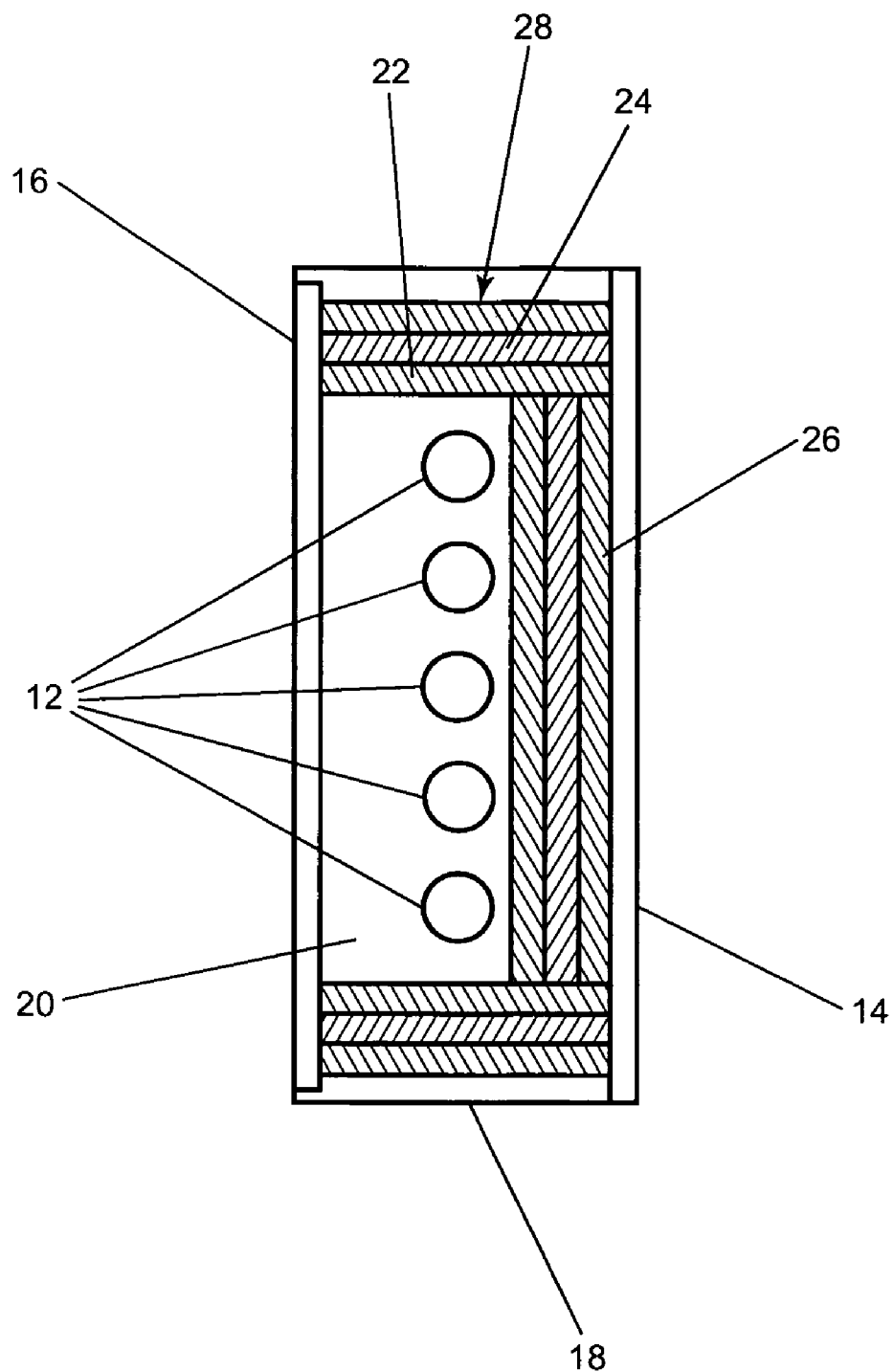
FIG. 2 is a block diagram cross section of the backlight assembly of FIG. 1.

FIG. 2 is a block diagram cross section of the backlight assembly of FIG. 1 with the different parts of the backlight assembled. The items in FIG. 2 are not shown to scale in terms of thickness, but they are positioned properly relative to one another. Lamp 12 resides within air filled lamp cavity 20. Encasing the inside of cavity 20 is a three-layered material combination 28. Three-layered material combination 28 can be adhesively applied to cavity, or by any other well known means. The layer of material 22 located nearest to lamp 12 and surrounding lamp cavity 20 is a diffusely reflective material. This diffusively reflective material 22 has virtually no absorption within the spectral wavelengths of 380 to 930 nanometers. The transmissive characteristics of this material 22 can be adjusted to accommodate the specific needs of a given design, but in general it has transmission between sixty percent (60%) and ninety percent (90%) and conversely has diffuse reflectivity between forty percent (40%) and ten percent (10%). The transmission and reflectivity characteristics of the diffusely reflective material 22 are essentially the same across all wavelengths of interest (380 to 930 nm) with much less than five percent (5%) variation from any wavelength to any other wavelength.

Figure 3:
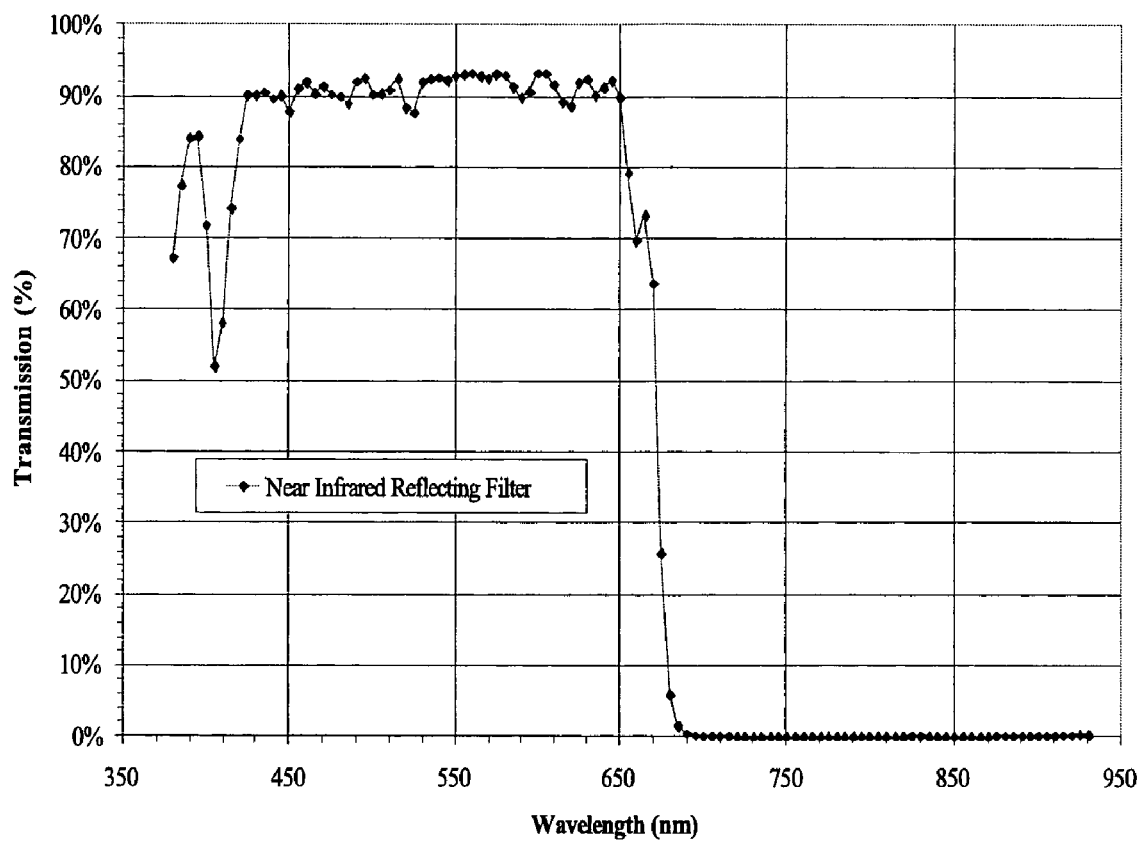
FIG. 3 is a linear plot of measured transmission of a near infrared reflecting optical filter.

Outside of diffusely reflective material 22 is near infrared transmitting optical filter material 24. Near infrared transmitting material 24 preferably has an optical characteristic similar to a cold mirror which transmits about eighty to ninety-five percent (~80-95%) of the red and near infrared wavelengths from approximately six hundred and sixty (660) to nine hundred and thirty nanometers (930 nm), and reflects eighty-five to ninety nine percent (85-99%) of the visible spectrum from three hundred and eighty (380) to approximately six hundred and twenty-five nanometers (625 nm). The exact wavelengths that are transmitted or conversely reflected by this material 24 are dependent upon the particular design and can be adjusted to suit the application. FIG. 3 shows the transmission characteristic of one particular type of optical filter which can be used for near infrared transmitting material 24 within the assembly. The near infrared transmitting material 24 itself can be any suitable substrate such as glass, polycarbonate, acrylic, or polyester (polyethylene terephthalate, PET, or polyethylene naphthalate, PEN) as long as it has the proper optical properties. The required optical characteristics can be achieved with standard thin film coating processes and designs.

Referring again to FIG. 2, the next layer out from near infrared transmitting optical filter material 24 is the near infrared absorbing material 26. Although it is desirable for this material to only absorb the energy transmitted by near infrared transmitting material 24, it can also absorb all wavelengths and still effectively function within the assembly. This absorptive material 26 can be black paint, black anodized aluminum or a similar material. The aluminum can also serve as the material to construct mounting plate 14 and sidewalls 18. The material for the absorbing material, mounting plate and side walls could also be constructed with painted or suitably colored plastic (e.g., polycarbonate, acrylic) which is structurally and thermally adequate for the particular application.

Figure 4:
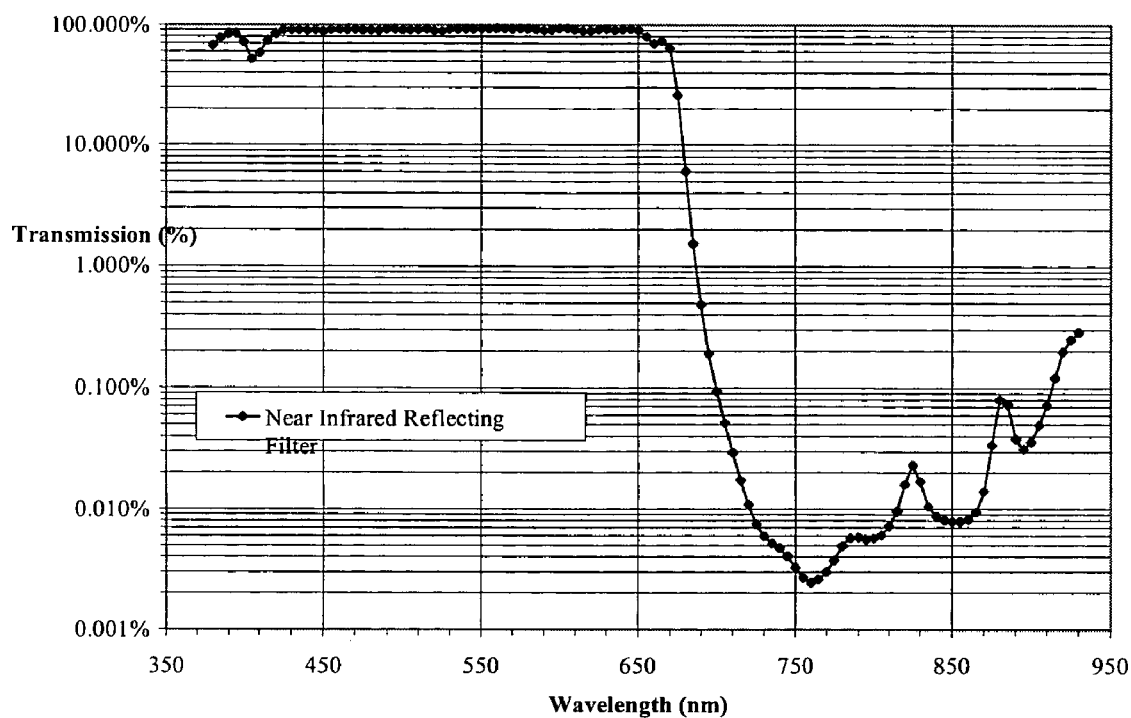
FIG. 4 is a semi-log plot of measured transmission of a near infrared reflecting optical filter.

The source of illumination is lamp 12 which is located within an air filled lamp cavity 20. Lamp 12 can be of any common type such as fluorescent, light emitting diode, incandescent, high intensity discharge which is electrically stimulated in a normal manner to excite the particular type of lamp used. The output illumination from lamp 12 first encounters the near infrared reflecting optical filter 16, mounting plate 14 or sidewalls 18 of lamp cavity 20. The lamp illumination contains energy at all wavelengths of interest between three hundred and eighty (380) and nine hundred and thirty nanometers (930 nm). The lamp illumination, which is incident upon near infrared reflecting optical filter 16, is either transmitted or reflected depending upon the wavelength, angle of incidence of the illumination and the filter's spectral transmission characteristics. An illustration of the spectral transmission characteristics of a typical near infrared reflecting optical filter 16 are shown in FIG. 3, a linear plot of measured transmission of a near infrared reflecting optical filter, and FIG. 4, a semi-log plot of measured transmission of a near infrared reflecting optical filter 16, for reference. The lamp illumination, which is transmitted, is compliant to the NVIS requirements because of the wavelength filtering characteristics of near infrared reflecting filter 16. The lamp illumination, which is reflected from near infrared reflecting filter 16, is recycled within lamp cavity 20 and the optical materials 28 lining this cavity. The energy which is in the near infrared region will eventually after potentially multiple reflections within lamp cavity 20 be absorbed in the near infrared absorbing material 26 which is attached to either lamp mounting plate 14 or sidewalls 18.

Figure 5:
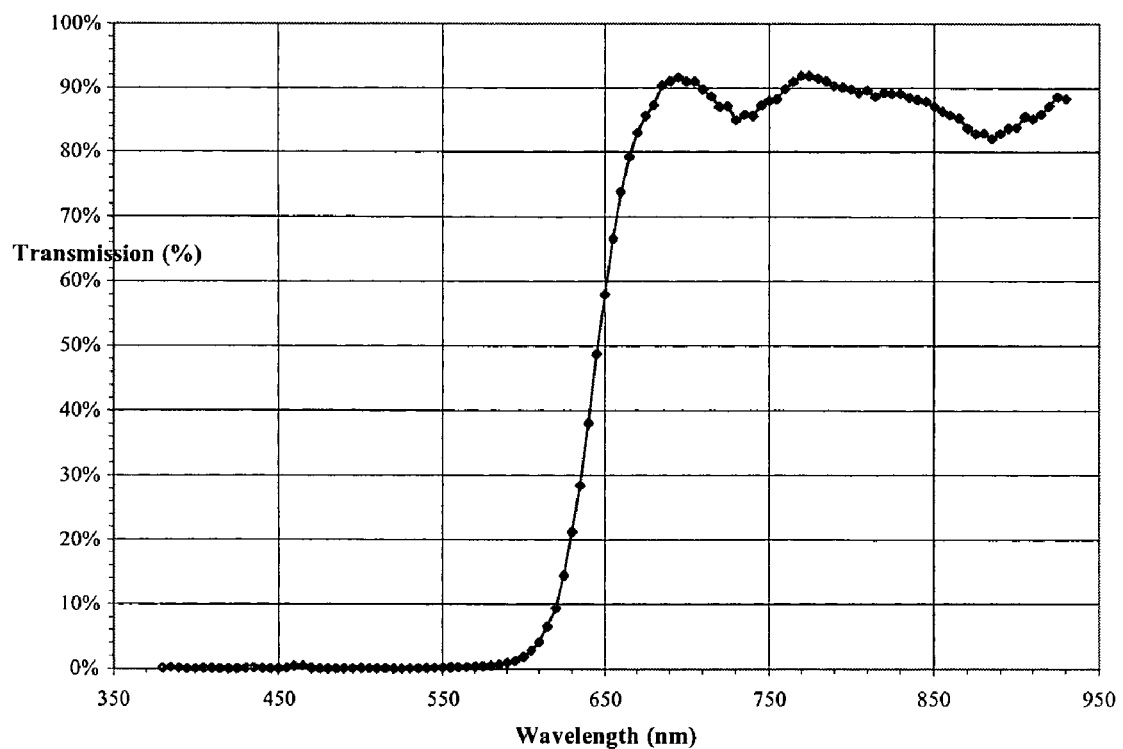
FIG. 5 is a linear plot of measured transmission of a near infrared transmitting optical coating.
Figure 6:
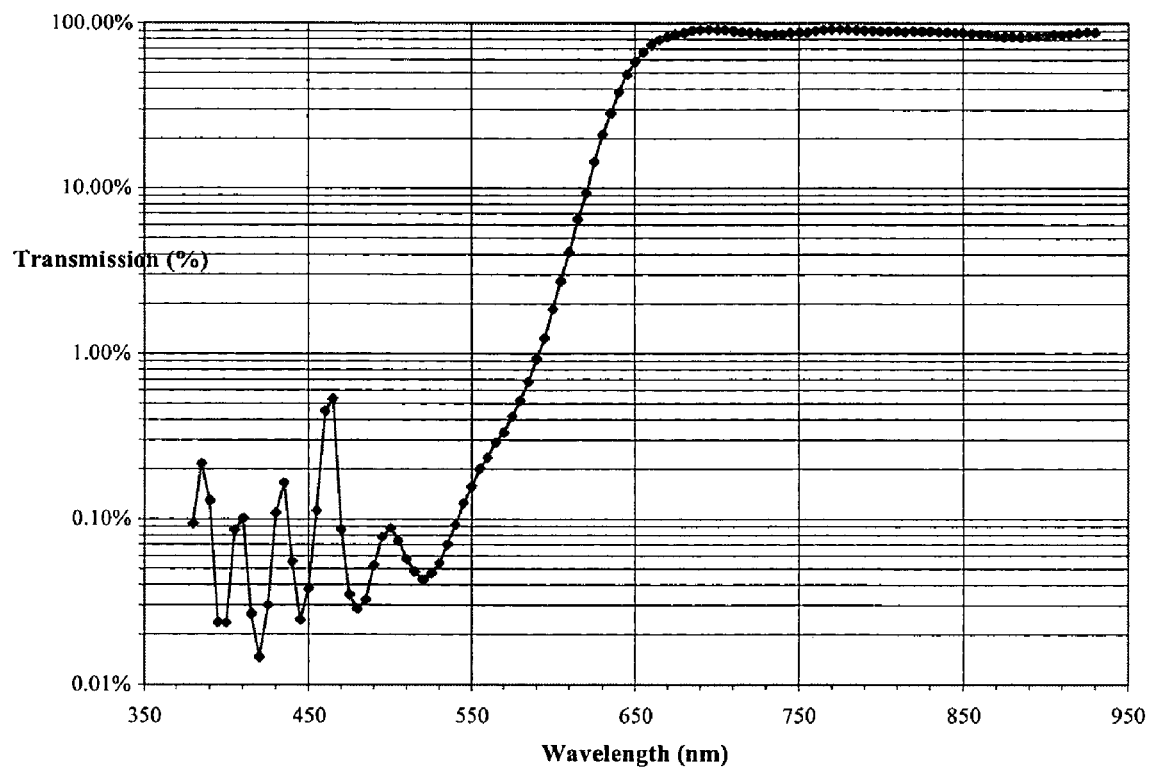
FIG. 6 is a semi-log plot of measured transmission of a near infrared transmitting optical coating.

The lamp illumination, which is incident upon mounting plate 14 or sidewalls 18 of lamp cavity 20, is either diffusely reflected or transmitted depending upon the transmission characteristics of diffusely reflective material 22. The portion which is reflected will, in general, either encounter near infrared reflecting filter 16 and will respond in a manner similar to the light emitted directly from lamp 12 or it will encounter diffusely reflective material 22 and will again either be transmitted or reflected in accordance with the transmission characteristics of diffusely reflecting material 22. The portion of illumination which is transmitted through diffusely reflective material 22 will be incident upon near infrared transmitting optical coating 24 and will be either transmitted or reflected depending upon the spectral transmission characteristics of this coating and the wavelength of the illumination. An illustration of the spectral transmission characteristics of a suitable coating for the near infrared transmitting optical coating 24 is shown in FIG. 5, a linear plot of measured transmission of a near infrared transmitting optical coating 24, and FIG. 6, a semi-log plot of measured transmission of a near infrared transmitting optical coating 24. The transmission characteristics of near infrared transmitting optical coating 24 are ideally the inverse characteristics of the near infrared reflecting filter 16 used to form the emitting surface of the lamp assembly such that the illumination reflected from near infrared reflecting optical filter 16 is transmitted by this filter.

The illumination which is reflected from near infrared transmitting coating 24 is processed back through the diffusely reflecting material 22 and eventually after potentially many reflections will traverse through near infrared reflecting filter 16 and be part of the output illumination from backlight assembly 10. The illumination which is transmitted through near infrared transmitting coating 24 will be absorbed by the near infrared absorbing material 26 and effectively removed from the illumination system.

Backlight assembly 10 in an alternative embodiment could include a diffusing optical element between the illumination source and the near infrared reflecting filter 16 (not shown). The purpose of the diffusing optical element (a.k.a., diffuser) is to help obscure the image of the light source and to help provide spatially uniform lighting from the assembly as is needed for backlighting a liquid crystal display. The diffusing optical element would not absorb radiation at any of the wavelengths of concern, or three hundred and eighty (380) to nine hundred and thirty nanometers (930 nm), but would merely partially transmit and partially reflect the incident illumination. This device would in general alter the direction of propagation of the incident radiation (i.e., scatter it) but would otherwise not impact its characteristics. The diffusing optical element could also be positioned adjacent to near infrared reflecting filter 16 on the outside of the assembly where the near infrared reflecting filter is between the lamp and diffuser (not shown).

The assembly could also be designed without diffusely reflecting material 22 (not shown). This would be more likely for a spot illumination system like an overhead compartment lighting assembly or a flashlight where the evenness or spatial uniformity of the output illumination is not as important as it is for backlighting an LCD. Elimination of the diffusely reflecting material is also possible for a LCD backlight assembly if the diffuser is included and provides sufficient scattering of the illumination to provide the required spatial uniformity of the output illumination.

Backlight assembly 10 in an alternative construction could have the various layers of material 28 lining the sidewalls 18 or mounting plate 14 constructed as single elements as opposed to the three independent layers described above. The order of the layers optical characteristics from the lamp 12 out to the sidewalls 18 and mounting plate 14 must still be maintained but the optical characteristics of the individual layers could be combined into a single element for a particular means of constructing the device. For example, the near infrared transmitting coating 24 could be deposited onto an infrared absorbing material such as a PEN film which includes a near infrared absorbing 26 die or it could be deposited directly onto a suitable absorptive plastic material which is used to construct the sidewalls 18 and mounting plate 14 (not shown). The device could also be constructed by directly depositing the diffusely reflecting material 22 onto the substrate containing the near infrared transmitting coating 24 (not shown). It is also possible to construct all of the optical characteristics of the diffusely reflecting material 22, near infrared reflecting material 24 and near infrared absorptive material 26 onto a substrate which is used to construct the sidewalls 18 and mounting plate 14 (not shown).

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A lighting assembly comprising:
an illumination source;
a wall forming a cavity encasing an edge and a back of the illumination source;
a material disposed on said wall, wherein said material comprises a first layer of a combination near infrared transmitting and visible reflecting material, and a second layer of a near infrared absorbing material disposed between said first layer and said wall; and
a combination near infrared reflecting and visible transmitting filter in a direct path of an exit port of the lighting assembly.

2. The lighting assembly of claim 1 wherein said illumination source comprises a member from the group consisting of fluorescent, light emitting diode and incandescent.

3. The lighting assembly of claim 1 wherein said combination near infrared transmitting and visible reflecting material comprises a thin film dielectric coating.

4. The lighting assembly of claim 1 wherein said near infrared absorbing material comprises a member from the group consisting of black paint, black anodized aluminum and colored plastic.

5. The lighting assembly of claim 1 wherein said combination near infrared transmitting and visible reflecting material is disposed between the illumination source and the near infrared absorbing material.

6. The lighting assembly of claim 1 further comprising a diffusing optical element disposed between the illumination source and the combination near infrared reflecting and visible transmitting filter.

7. The lighting assembly of claim 1 further comprising a diffusing optical element disposed on the combination near infrared reflecting and visible transmitting filter.

8. The lighting assembly of claim 1 wherein said material comprises a single element.

9. The lighting assembly of claim 1 wherein said material further comprises a diffusely reflecting material.

10. A lighting assembly comprising:
an illumination source;
a wall forming a cavity encasing an edge and back of the illumination source;
a material disposed on said wall, wherein said material comprises a first layer of a diffusely reflecting material, a second layer of a combination near infrared transmitting and visible reflecting material, and a third layer of a near infrared absorbing material disposed on said wall, said second layer disposed between said first layer and said third layer; and
a combination near infrared reflecting and visible transmitting filter in a direct path of an exit port of the lighting assembly.

11. The lighting assembly of claim 10 wherein said illumination source comprises a member from the group consisting of fluorescent, light emitting diode and incandescent.

12. The lighting assembly of claim 10 wherein said combination near infrared transmitting and visible reflecting material comprises a thin film dielectric coating.

13. The lighting assembly of claim 10 wherein said near infrared absorbing material comprises a member from the group consisting of black paint, black anodized aluminum and colored plastic.

14. The lighting assembly of claim 10 wherein said diffusely reflecting material is disposed between the illumination source and the combination near infrared transmitting and visible reflecting material.

15. The lighting assembly of claim 10 further comprising a diffusing optical element between the illumination source and the combination near infrared reflecting and visible transmitting filter.

16. The lighting assembly of claim 10 further comprising a diffusing optical element disposed on the combination near infrared reflecting and visible transmitting filter.

17. The lighting assembly of claim 10 wherein said material comprises a single element.

* * * * *